US012787105B2

(12) United States Patent
Fu et al.

(10) Patent No.: US 12,787,105 B2
(45) Date of Patent: Nov. 3, 2026

(54) MEASUREMENT PROCESSING METHOD, APPARATUS AND STORAGE MEDIUM

(71) Applicant: DATANG MOBILE COMMUNICATIONS EQUIPMENT CO., LTD., Beijing (CN)

(72) Inventors: Jing Fu, Beijing (CN); Jinhua Miao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 309 days.

(21) Appl. No.: 18/697,019

(22) PCT Filed: Oct. 21, 2022

(86) PCT No.: PCT/CN2022/126774
§ 371 (c)(1),
(2) Date: Mar. 29, 2024

(87) PCT Pub. No.: WO2023/066385
PCT Pub. Date: Apr. 27, 2023

(65) Prior Publication Data

US 2025/0039974 A1 Jan. 30, 2025

(30) Foreign Application Priority Data

Oct. 22, 2021 (CN) ......................... 202111236414.0

(51) Int. Cl.
*H04W 4/00* (2018.01)
*H04W 36/00* (2009.01)
*H04W 76/27* (2018.01)

(52) U.S. Cl.
CPC ....... *H04W 76/27* (2018.02); *H04W 36/0058* (2018.08)

(58) Field of Classification Search
CPC .......................... H04W 76/27; H04W 36/0058
See application file for complete search history.

(56) References Cited

U.S. PATENT DOCUMENTS 11,843,962 B2 * 12/2023 Kim ...................... H04W 24/08
2020/0112895 A1 * 4/2020 Tang .................... H04B 7/0413
(Continued)

FOREIGN PATENT DOCUMENTS

CN 101282240 A 10/2008
CN 108738096 A 11/2018
(Continued)

OTHER PUBLICATIONS

The extended European search report received in the counterpart European Application 22882989.1, mailed on Jan. 17, 2025.
(Continued)

*Primary Examiner* — Abdelnabi O Musa
(74) *Attorney, Agent, or Firm* — KILPATRICK TOWNSEND & STOCKTON LLP

(57) ABSTRACT

The present disclosure provides a measurement processing method, an apparatus and a storage medium. At a terminal side, the method includes: determining to perform a SDT; and changing a measurement operation to be performed by the terminal in an idle state or an inactive state during execution of the SDT; where the changing the measurement operation to be performed by the terminal in the idle state or the inactive state includes one or more of the following: changing a measurement operation for a cell reselection to be performed by the terminal in the idle state or the inactive state; and not triggering a first measurement to be performed by the terminal in the idle state or the inactive state, where a measurement result of the first measurement is used to assist the terminal in configuring a DC or configuring a CA in an active state.

15 Claims, 4 Drawing Sheets

(56) References Cited

U.S. PATENT DOCUMENTS

| | | | | |
|---|---|---|---|---|
| 2020/0344629 | A1* | 10/2020 | Kim | H04W 24/10 |
| 2021/0022185 | A1 | 1/2021 | Fujishiro et al. | |
| 2021/0037433 | A1 | 2/2021 | Lee et al. | |
| 2021/0105672 | A1 | 4/2021 | Hwang et al. | |
| 2021/0377829 | A1 | 12/2021 | Wang | |
| 2021/0410180 | A1* | 12/2021 | Tsai | H04W 72/1268 |
| 2022/0046749 | A1* | 2/2022 | Lin | H04W 24/08 |
| 2022/0086899 | A1* | 3/2022 | Shih | H04L 5/0053 |
| 2022/0361278 | A1* | 11/2022 | Tsai | H04W 72/21 |
| 2022/0361279 | A1* | 11/2022 | Chin | H04W 74/0833 |
| 2023/0088189 | A1* | 3/2023 | Tseng | H04W 52/0225 370/252 |
| 2023/0247721 | A1* | 8/2023 | Kim | H04W 76/27 370/329 |
| 2023/0276318 | A1* | 8/2023 | Wei | H04W 36/0072 370/329 |
| 2023/0362765 | A1* | 11/2023 | Zheng | H04W 36/0088 |
| 2024/0276275 | A1* | 8/2024 | Kumar | H04W 74/0833 |
| 2024/0349099 | A1* | 10/2024 | Koskinen | H04W 24/10 |
| 2024/0406846 | A1* | 12/2024 | Wu | H04W 24/10 |

FOREIGN PATENT DOCUMENTS

| | | | |
|---|---|---|---|
| CN | 110859002 | A | 3/2020 |
| CN | 110945960 | A | 3/2020 |
| CN | 111034327 | A | 4/2020 |
| CN | 111050352 | A | 4/2020 |
| CN | 111800888 | A | 10/2020 |
| CN | 111866926 | A | 10/2020 |
| CN | 111937428 | A | 11/2020 |
| CN | 118176820 | A | 6/2024 |
| WO | 2020164101 | A1 | 8/2020 |
| WO | 2020256420 | A1 | 12/2020 |
| WO | 2020263283 | A1 | 12/2020 |
| WO | 2021056465 | A1 | 4/2021 |
| WO | 2021163394 | A1 | 8/2021 |

OTHER PUBLICATIONS

3GPP TS 36.300 V16.4.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2, (Release 16), Dec. 2020.

Office Action of Corresponding CN Patent Application No. 202111236414.0 Dated Jul. 31, 2025.

The second office action and search report issued in Chinese corresponding application 202111236414.0, mailed on Jan. 12, 2026.

State Intellectual Property Office of the People's Republic of China, International Search Report and written opinion Issued in Application No. PCT/CN2022/126774, Jan. 18, 2023, 13 pages.

Ericsson, "CP aspects for SDT", 3GPP TSG-RAN WG2 #115-e, Electronic meeting, Aug. 16, 2021-Aug. 27, 2021, total 4 pages, R2-2108089.

Spreadtrum Conmmunications, "Discussion on RACH-based SDT", 3GPP TSG-RAN WG2 Meeting #115 electronic, Online, Aug. 16-27, 2021, total 2 pages, R2-2107354.

ITRI, "Discussion on how to handle cell reselection during T319 for the case of SDT", 3GPP TSG RAN WG2#112 electronic, Online, Nov. 2-13, 2020, total 2 pages, R2-2009643.

The Notice of Allowance and Search Report issued in Chinese corresponding application 202111236414.0, mailed on Mar. 31, 2026.

Ericsson, "SSTTD reporting in NSA NR", 3GPP TSG RAN WG4 Meeting #84bis, Dubrovnik, Croatia, Oct. 9-13, 2017, total 10 pages, R4-1711457.

* cited by examiner

MEASUREMENT PROCESSING METHOD, APPARATUS AND STORAGE MEDIUM

The present disclosure is a National Stage of International Application No. PCT/CN2022/126774, filed on Oct. 21, 2022, which claims priority to Chinese patent application No. 202111236414.0, titled "MEASUREMENT PROCESSING METHOD, APPARATUS AND STORAGE MEDIUM" and filed with the China National Intellectual Property Administration on Oct. 22, 2021. The contents of the two applications are incorporated into this disclosure by reference in their entireties.

FIELD

The present disclosure relates to the field of communication, and in particular, to a measurement processing method, an apparatus and a storage medium.

BACKGROUND

In a communication system, a terminal can be in any of the following radio resource control (RCC) states: an idle state, an inactive state and a connected state. Among them, when the terminal is in the idle state or the inactive state, the terminal generally does not transmit data to a network side, and the terminal needs to be switched to the connected state if a data transmission is required. However, in order to prevent the terminal from frequently entering the connected state and reduce a data transmission delay, a small data transmission (SDT) can be allowed between the terminal and a network device.

At present, when the terminal is in the idle state or the inactive state, it is necessary to perform a measurement on a service cell and a neighboring cell according to certain rules, to continuously perform cell reselection to camp on a cell with better channel quality. However, the above-mentioned measurement scheme of the idle state or the inactive state has an influence on data transmission in the SDT process, and is not suitable for the SDT process.

SUMMARY

The present disclosure provide a measurement processing method, an apparatus and a storage medium, for providing a measurement scheme suitable for a terminal in an idle state or an inactive state in the process of performing a SDT.

In a first aspect, the present disclosure provides a measurement processing method applied to a terminal, and including:

determining to perform a small data transmission SDT; and changing a measurement operation to be performed by the terminal in an idle state or an inactive state during execution of the SDT;

where the changing the measurement operation to be performed by the terminal in the idle state or the inactive state includes one or more of the following:

changing a measurement operation for a cell reselection to be performed by the terminal in the idle state or the inactive state; and stopping or not triggering a first measurement to be performed by the terminal in the idle state or the inactive state, where a measurement result of the first measurement is used to assist the terminal in configuring a DC or configuring a CA in an active state.

In an implementation, the changing the measurement operation for the cell reselection to be performed by the terminal in the idle state or the inactive state includes one or more of the following:

upgrading a priority of a frequency point corresponding to a service cell where the terminal is located; and performing the measurement operation for the cell reselection according to first configuration information from a network device, where the first configuration information carries a measurement parameter used for the cell reselection in the SDT.

In an implementation, the upgrading the priority of the frequency point corresponding to the service cell where the terminal is located includes one or more of the following:

downgrading a priority of a first frequency point, where the first frequency point is other frequency points with higher priority than the priority of the frequency point corresponding to the service cell where the terminal is located; and setting the priority of the frequency point corresponding to the service cell where the terminal is located as a highest priority.

In an implementation, the performing the measurement operation for the cell reselection according to the first configuration information from the network device includes:

if it is determined that the measurement parameter in the first configuration information is missed, performing a measurement for the cell reselection according to the first configuration information and second configuration information;

where the second configuration information carries a measurement parameter used for the cell reselection when the SDT is not performed.

In an implementation, the first configuration information includes at least one of the following measurement parameters: a frequency point to be measured, a priority of the frequency point to be measured, an offset value corresponding to the frequency point to be measured during the cell reselection, a cell to be measured, an offset value corresponding to the cell to be measured during the cell reselection, or an effective time.

In an implementation, the measurement processing method further includes:

if the first measurement to be performed by the terminal in the idle state or the inactive state is stopped or not triggered during the execution of the SDT, stopping or suspending a target timer, where the target timer is configured to determine whether third configuration information corresponding to the execution of the first measurement is valid;

and/or storing fourth configuration information corresponding to the measurement operation to be performed by the terminal in the idle state or the inactive state, and the terminal is configured to perform the measurement operation according to the fourth configuration information after finishing the SDT.

In an implementation, after stopping or suspending the target timer, the measurement processing method further includes:

starting or resuming the target timer after the execution of the SDT is finished.

In a second aspect, the present disclosure provide a measurement processing method applied to a network device, and including:

sending first configuration information to a terminal, where the first configuration information carries a measurement parameter used for the terminal to perform a cell reselection in a SDT.

In an implementation, the first configuration information includes at least one of the following measurement parameters: a frequency point to be measured, a priority of the frequency point to be measured, an offset value corresponding to the frequency point to be measured during the cell reselection, a cell to be measured, an offset value corresponding to the cell to be measured during the cell reselection, or an effective time.

In a third aspect, the present disclosure provides a measurement processing apparatus applied to a terminal, and including a memory, a transceiver and a processor:

the memory is configured to store a computer program;

the transceiver is configured to transmit and receive data under control of the processor;

the processor is configured to read the computer program in the memory and performing the following operations:

determining to perform a small data transmission SDT; and changing a measurement operation to be performed by the terminal in an idle state or an inactive state during execution of the SDT;

where the changing the measurement operation to be performed by the terminal in the idle state or the inactive state includes one or more of the following:

changing a measurement operation for a cell reselection to be performed by the terminal in the idle state or the inactive state; and stopping or not triggering a first measurement to be performed by the terminal in the idle state or the inactive state, where a measurement result of the first measurement is used to assist the terminal in configuring a DC or configuring a CA in an active state.

In an implementation, the processor is further configured to perform one or more of the following operations:

upgrading a priority of a frequency point corresponding to a service cell where the terminal is located; and performing the measurement operation for the cell reselection according to first configuration information from a network device, where the first configuration information carries a measurement parameter used for the cell reselection in the SDT.

In an implementation, the processor is further configured to perform one or more of the following operations:

downgrading a priority of a first frequency point, where the first frequency point is other frequency points with higher priority than the priority of the frequency point corresponding to the service cell where the terminal is located; and setting the priority of the frequency point corresponding to the service cell where the terminal is located as a highest priority.

In an implementation, the processor is further configured to perform the following operation:

if it is determined that the measurement parameter in the first configuration information is missed, performing a measurement for the cell reselection according to the first configuration information and second configuration information;

where the second configuration information carries a measurement parameter used for the cell reselection when the SDT is not performed.

In an implementation, the first configuration information includes at least one of the following measurement parameters: a frequency point to be measured, a priority of the frequency point to be measured, an offset value corresponding to the frequency point to be measured during the cell reselection, a cell to be measured, an offset value corresponding to the cell to be measured during the cell reselection, or an effective time.

In an implementation, the processor is further configured to perform one or more of the following operations:

if the first measurement to be performed by the terminal in the idle state or the inactive state is stopped or not triggered during the execution of the SDT, stopping or suspending a target timer, where the target timer is configured to determine whether third configuration information corresponding to the execution of the first measurement is valid; and and/or storing fourth configuration information corresponding to the measurement operation to be performed by the terminal in the idle state or the inactive state, and the terminal is configured to perform the measurement operation according to the fourth configuration information after finishing the SDT.

In an implementation, the processor is further configured to perform the following operation:

starting or resuming the target timer after the execution of the SDT is finished.

In a fourth aspect, the present disclosure provides a measurement processing apparatus applied to a network device, and including a memory, a transceiver and a processor:

the memory is configured to store a computer program;

the transceiver is configured to transmit and receive data under control of the processor;

the processor is configured to read the computer program in the memory and performing the following operation:

sending first configuration information to a terminal, where the first configuration information carries a measurement parameter used for the terminal to perform a cell reselection in a SDT.

In an implementation, the first configuration information includes at least one of the following measurement parameters: a frequency point to be measured, a priority of the frequency point to be measured, an offset value corresponding to the frequency point to be measured during the cell reselection, a cell to be measured, an offset value corresponding to the cell to be measured during the cell reselection, or an effective time.

In a fifth aspect, the present disclosure provides a measurement processing apparatus applied to a terminal, and including:

a determining unit, configured to determine to perform a small data transmission SDT; and a processing unit, configured to change a measurement operation to be performed by the terminal in an idle state or an inactive state during execution of the SDT;

where the changing the measurement operation to be performed by the terminal in the idle state or the inactive state includes one or more of the following:

changing a measurement operation for a cell reselection to be performed by the terminal in the idle state or the inactive state; and stopping or not triggering a first measurement to be performed by the terminal in the idle state or the inactive state, where a measurement result of the first measurement is used to assist the terminal in configuring a DC or configuring a CA in an active state.

In an implementation, the processing unit is further configured to perform one or more of the following operations:

upgrading a priority of a frequency point corresponding to a service cell where the terminal is located; and performing the measurement operation for the cell reselection according to first configuration information from a network device, where the first configuration information carries a measurement parameter used for the cell reselection in the SDT.

In an implementation, the processing unit is further configured to perform one or more of the following operations:

downgrading a priority of a first frequency point, where the first frequency point is other frequency points with higher priority than the priority of the frequency point corresponding to the service cell where the terminal is located; and setting the priority of the frequency point corresponding to the service cell where the terminal is located as a highest priority.

In an implementation, the processing unit is further configured to perform the following operation:

if it is determined that the measurement parameter in the first configuration information is missed, performing a measurement for the cell reselection according to the first configuration information and second configuration information;

where the second configuration information carries a measurement parameter used for the cell reselection when the SDT is not performed.

In an implementation, the first configuration information includes at least one of the following measurement parameters: a frequency point to be measured, a priority of the frequency point to be measured, an offset value corresponding to the frequency point to be measured during the cell reselection, a cell to be measured, an offset value corresponding to the cell to be measured during the cell reselection, or an effective time.

In an implementation, the processing unit is further configured to perform one or more of the following operations:

if the first measurement to be performed by the terminal in the idle state or the inactive state is stopped or not triggered during the execution of the SDT, stopping or suspending a target timer, where the target timer is configured to determine whether third configuration information corresponding to the execution of the first measurement is valid;

and/or storing fourth configuration information corresponding to the measurement operation to be performed by the terminal in the idle state or the inactive state, and the terminal is configured to perform the measurement operation according to the fourth configuration information after finishing the SDT.

In an implementation, the processing unit is further configured to perform the following operation:

starting or resuming the target timer after the execution of the SDT is finished.

In a sixth aspect, the present disclosure provides a measurement processing apparatus applied to a network device, and including:

a sending unit, configured to send first configuration information to a terminal, where the first configuration information carries a measurement parameter used for the terminal to perform a cell reselection in a SDT.

In an implementation, the first configuration information includes at least one of the following measurement parameters: a frequency point to be measured, a priority of the frequency point to be measured, an offset value corresponding to the frequency point to be measured during the cell reselection, a cell to be measured, an offset value corresponding to the cell to be measured during the cell reselection, or an effective time.

In a seventh aspect, the present disclosure provides a processor-readable storage medium, where a computer program is stored in the processor-readable storage medium, and the computer program is used for causing a processor to perform the measurement processing method as described in the first or second aspect.

In an eighth aspect, the present disclosure provides a computer program product including instructions which, when run on a computer, cause the computer to perform the measurement processing method as described in the first or second aspect above.

In a ninth aspect, the present disclosure provides a communication system, including any one of the above-mentioned terminals and any one of the above-mentioned network devices.

According to the measurement processing method, apparatus and storage medium provided by the present disclosure, the terminal, after determining to perform a SDT; changes a measurement operation to be performed by the terminal in an idle state or an inactive state during execution of the SDT; where the changing the measurement operation to be performed by the terminal in the idle state or the inactive state includes one or more of the following: changing a measurement operation for a cell reselection performed by the terminal in the idle state or the inactive state; and stopping or not triggering a first measurement to be performed by the terminal in the idle state or the inactive state, where a measurement result of the first measurement is used to assist the terminal in configuring a DC or configuring a CA in an active state. Therefore, in the process of performing the SDT, the terminal in the idle state or the inactive state automatically changes the measurement in the current state to reduce unnecessary terminal behavior and power consumption of the terminal, to reduce the influence of the measurement of the terminal in the current state on the SDT and reducing unnecessary interruption in the SDT.

It should be understood that what is described in the above summary is not intended to define key or important features of the embodiments of the present disclosure, nor is it intended to limit the scope of the present disclosure. Other features of the present disclosure will be readily understood from the following description.

BRIEF DESCRIPTION OF DRAWINGS

In order to describe the embodiments of the present disclosure or prior art more clearly, in the following, drawings that need to be used in the description of the embodiments or prior art will be introduced briefly. The drawings described below are some embodiments of the present disclosure.

DESCRIPTION OF EMBODIMENTS

Figure 1:
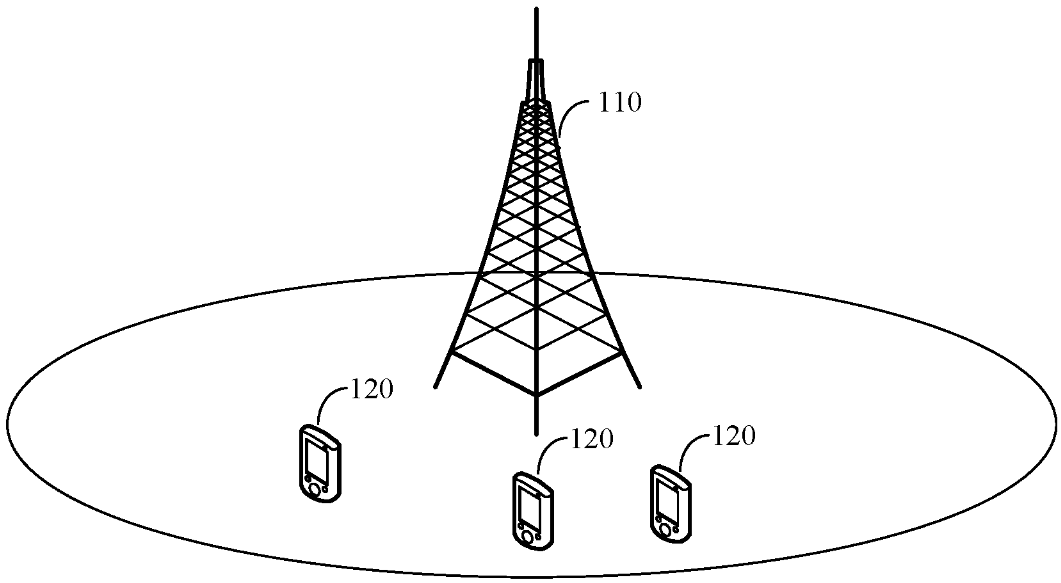
FIG. 1 is a schematic diagram of an application scenario provided by an embodiment of the present disclosure.

In the present disclosure, "at least one" refers to one or more, and "multiple" refers to two or more. "And/or", which describes relevance relationship of related objects, means that there can be three relationships, for example, A and/or B could represents that: A exists alone, A and B exist at the same time, and B exists alone, where A and B can be singular or plural. The character "/" generally indicates that the context objects are in an OR relationship. "At least one of the following items (subjects)" or its similar expression refers to any combination of these items, including any combination of single item (subject) or plural items (subjects). For example, at least one item (subject) of a, b, or c can could represent that: a, b, c, a-b, a-c, b-c, or a-b-c, where a, b, and c can be singular or plural.

It can be understood that each step or operation in the disclosed embodiments is only exemplary, and the disclosed embodiments can also perform other operations or variations of various operations. Furthermore, each step may be performed in a different order than presented by the embodiments of the present disclosure, and it may not be necessary to perform all the operations in the embodiments of the present disclosure.

In the following, the embodiments of the disclosure will be clearly and completely described with reference to the attached drawings. Obviously, the described embodiments is only a part of the embodiments of the disclosure, but not the whole embodiment.

The embodiments of the present disclosure can be applied to various systems, especially 5G systems. For example, an applicable system can be: a global system of mobile communication (GSM) system, a code division multiple access (CDMA) system, a wideband code division multiple access (WCDMA) system, a general packet radio service (GPRS) system, a long term evolution (LTE) system, a LTE frequency division duplex (FDD) system, a LTE time division duplex (TDD) system, a long term evolution advanced (LTE-A) system, a universal mobile telecommunication system (UMTS), a worldwide interoperability for microwave access (WiMAX) system, a 5G New Radio (NR) system, etc. These various systems all include terminals and network devices. The system may also include a core network portion, such as an evolved packet system (EPS), a 5G system (5GS), etc.

The terminal involved in the embodiments of the present disclosure may be a device that provides voice and/or data connectivity to a user, a handheld device with a wireless connection function, or other processing devices connected to a wireless modem. The name of the terminal may also vary in different systems. For example, in a 5G system, the terminal may be referred as a user equipment (UE). A wireless terminal may communicate with one or more core networks (CN) via a radio access network (RAN). The wireless terminal may be a mobile terminal, such as a cell phone (or referred as a "cellular" phone) and a computer with a mobile terminal, for example, a portable, pocket-sized, handheld, computer built-in, or vehicle-mounted mobile apparatus, that exchanges voice and/or data with the radio access network. For example, a personal communication service (PCS) phone, a cordless phone, a session initiated protocol (SIP) phone, a wireless local loop (WLL) station, a personal digital assistant (PDA) or other devices. The wireless terminal can also be referred as a system, a subscriber unit, a subscriber station, a mobile station, a mobile, a remote station, an access point, a remote terminal, an access terminal, a user terminal, a user agent, and a user device, which are not limited in the embodiments of the present disclosure.

The network device involved in the embodiments of the present disclosure may be a base station, which may include cells providing services to a terminal. Depending on the specific application scenario, the base station can also be referred as an access point, or a device in the access network that communicates with the wireless terminal through one or more sectors on an air interface, or other names. The network device may be used to interchange a received air frame with an Internet protocol (IP) packet, and may act as a router between the wireless terminal and the rest of the access network, the rest of the access network may include an Internet protocol (IP) communication network. The network device may also coordinate the management of attributes of the air interface. For example, the network device involved in the embodiments of the present disclosure may be a base station (Base Transceiver Station, BTS) in a global system for mobile communications system (GSM) or code division multiple access (CDMA), or a network device (NodeB) in a wide-band code division multiple access (WCDMA), or an evolutional network device (evolutional Node B, eNB or e-NodeB) in a long term evolution (LTE) system, or a 5G base station (gNB) in a 5G network architecture (next generation system), or a home evolved base station (HeNB), or a relay node (relay node), a home base station (femto), a pico base station (pico), etc., which are not limited in the embodiments of the present disclosure. In some network structures, the network device may include a centralized unit (CU) node and a distributed unit (DU) node, and the centralized unit and the distributed unit may also be geographically separated.

The network device and the terminal can use one or more antennas respectively for multi input multi output (MIMO) transmission, and the MIMO transmission can be single user MIMO (SU-MIMO) or multiple user MIMO (MU-MIMO). According to the shape and the number of the antenna combinations, the MIMO transmission can be 2D-MIMO, 3D-MIMO, FD-MIMO or massive-MIMO, or can be diversity transmission, pre-coded transmission or beamforming transmission, etc.

In order to understand this scheme more clearly, the radio resource control (RCC) state, the small data transmission (SDT) and the problems exist in the prior art involved in this scheme are briefly described as follows.

I. RRC States

In a communication system, three RRC states are designed for a terminal: a connected (RRC_CONNECTED) state, an idle (RRC IDLE) state and an inactive (RRC_INACTIVE) state. At a moment, the terminal can only be in one of these states. In the following, terminal behavior in each state is exemplified.

In the idle state: (1) the terminal can obtain system information (SI), for example, the terminal can obtain more SI through SI request; (2) the terminal can obtain a paging message; (3) a mobility management mechanism automatically controlled by the terminal is adopted, that is, the terminal decides a cell selection and a reselection independently on a basis that the terminal performs a measurement behavior.

In the inactive state: (1) a discontinuous reception (DRX) unique to the terminal can be configured by a upper layer or a RRC layer; (2) the terminal performs mobility controlled by the terminal based on network configuration, that is, the terminal can move autonomously within an area configured by the network without notifying the network; (3) the terminal saves context of an access stratum (AS); (4) RRC layer is configured with a notification area based on RAN, in the notification area, the terminal performs autonomous mobility; (5) the terminal can obtain a paging message; (6) in order to support mobility function, the terminal performs measurement of neighboring cells and cell selection and reselection; (6) the terminal will also perform periodic update on the notification area based on the RAN and update when the terminal moves out of the configured notification area based on the RAN; (7) the terminal can obtain the SI.

It can be seen that when the terminal is in the idle state or the inactive state, it is necessary to perform measurements on the service cell and the neighboring cell according to certain rules, and to continuously perform cell reselection based on a measurement result, which is convenient for the terminal to camp on a cell with higher priority or better channel quality.

At present, idle/inactive measurement (idle/inactive measurement) is also introduced for a terminal in the idle state or the inactive state. Among them, idle/inactive measurement means that the terminal in idle state or the inactive state performs relevant measurement and stores a measurement result, and after entering the connected state, the terminal reports the measurement result to the network device to assist the network device to quickly configure the terminal with an appropriate dual connectivity (DC)/carrier aggregation (CA).

(2) SDT

A SDT transmission conducted by the terminal in the inactive state includes two schemes: using RRC signaling for the SDT transmission and RRC signaling is not used for the SDT transmission. At present, the scheme adopted is using the RRC signaling for the SDT transmission, that is, a RRCResumeRequest message is sent to the network side together with the small data packet to be transmitted, which triggers a subsequent flow of a SDT process. When the terminal receives the RRCRelease message, it means that the SDT process is terminated. Among them, a whole SDT process may involve a transmission of more than one small data packet.

In addition, the SDT scheme may be further applied to the idle state in the future.

In the idle state or the inactive state, generally, the terminal does not communicate with the network device, while the SDT process is a special process in the idle state or the inactive state, involving a transmission of multiple data packets. However, at present, different measurement processing is not provided for a terminal in view of the two situations that the terminal performs the SDT measurement and the terminal does not perform the SDT. In the SDT, the terminal needs to conduct the data transmission. At this time, if the terminal has multiple measurement operations in the idle state or the inactive state, the SDT will be affected, leading to unnecessary interruption in the SDT.

In order to solve the above problems, embodiments of the present disclosure provide a measurement processing method, apparatus and storage medium. In this method, during an execution of the SDT, the terminal changes a measurement operation to be performed in an idle state or an inactive state, including changing a measurement operation for a cell reselection, and/or stopping or not triggering a first measurement, where a measurement result of the first measurement is used to assist the terminal to perform a DC or a CA in an active state. Therefore, in the SDT process, unnecessary terminal behavior is reduced, terminal power consumption is reduced, unnecessary interruption due to measurement conducted by the terminal in the SDT are reduced, and a measurement scheme suitable for the SDT is provided.

Among them, the method and the apparatus are based on the same application concept. As the principle of solving the problems in the method and the apparatus is similar, the implementation of the apparatus and the method can be referred to each other, and the repetition is not descripted here.

Referring to FIG. 1, FIG. 1 is a schematic diagram of an application scenario provided by an embodiment of the present disclosure. As shown in FIG. 1, this embodiment provides a communication system, which includes a network device 110 and a terminal 120, where this embodiment is illustrated by taking three terminals 120 as an example. In the communication system, when the terminal 120 is in an idle state or an inactive state, a plurality of data packets can be transmitted with the network device 110 by performing the SDT process to avoid the terminal 120 from frequently entering a connected state.

Figure 2:
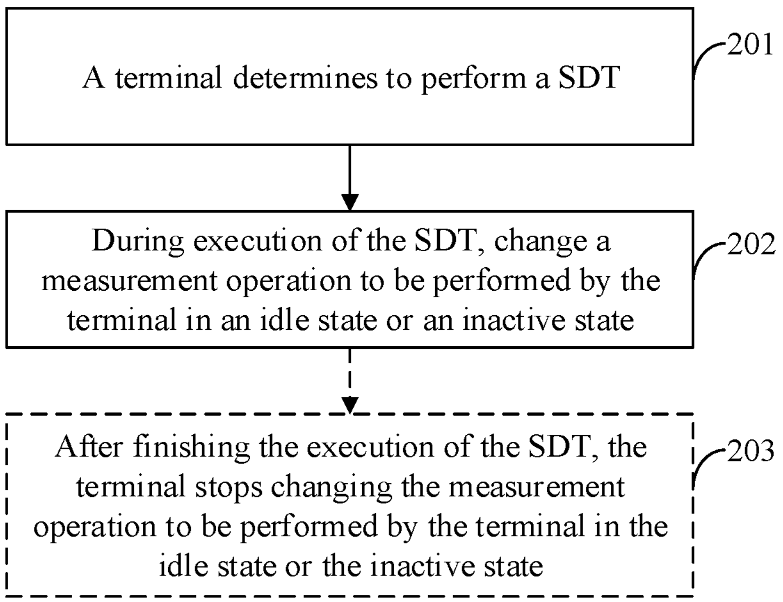
FIG. 2 is a flowchart of a measurement processing method provided by an embodiment of the present disclosure.

Referring to FIG. 2, FIG. 2 is a flowchart of a measurement processing method provided by an embodiment of the present disclosure, which is applied to a terminal. As shown in FIG. 2, the measurement processing method of this embodiment may include:

S201: the terminal determines to perform a SDT.

In this embodiment, under a condition that the network device provides configuration information of the SDT for the terminal, the terminal in the idle state or the inactive state can determine to perform the SDT according to data transmission requirements. Here, there are no restrictions on the configuration process of the SDT and how to perform the SDT.

S202: during execution of the SDT, change a measurement operation to be performed by the terminal in an idle state or an inactive state.

In this embodiment, before the SDT, the terminal can perform the measurement operation according to configuration information provided by the network device for measurement of the terminal in the idle state or the inactive state. For example, in the idle state or the inactive state, the terminal continuously performs measurement on a service cell and a neighboring cell according to the configuration information used for a cell reselection, and performs the cell reselection based on a measurement result. For another example, the terminal performs a first measurement, and the terminal sends a measurement result of the first measurement to the network device after the terminal enters the connected state, to assist the network device to quickly configure the terminal with an appropriate DC/CA. After determining to perform the SDT, the terminal can change the measurement operation to be performed in the idle state or the inactive state on the basis of ensuring the data transmission of the SDT during the execution of the SDT, to reduce unnecessary measurement operation during the execution of the SDT, that is, to reduce unnecessary terminal behavior, reduce terminal power consumption and reduce unnecessary interruption in the SDT.

Among them, in S202, the changing the measurement operation to be performed by the terminal in the idle state or the inactive state includes one or more possible implementations as follows: in a first way, the measurement operation for the cell reselection to be performed by the terminal in the idle state or the inactive state is changed; in a second way, the first measurement to be performed by the terminal in the idle state or the inactive state is stopped, where the measurement result of the first measurement is used to assist the terminal to configure the DC or configure the CA in the active state; in a third way, the first measurement to be performed by the terminal in the idle state or the inactive state is not triggered, where the measurement result of the first measurement is used to assist the terminal to configure the DC or configure the CA in the active state. Therefore, in the SDT, the terminal reduces the terminal behavior and power consumption by changing the measurement operation for the cell reselection and/or by stopping or not triggering the first measurement. Among them, the terminal can change the measurement operation for the cell reselection without affecting the data transmission of the SDT. The two implementations will be described through several embodiments in the following.

Among them, not triggering the first measurement to be performed by the terminal in the idle state or the inactive state includes the following situations: in a first case, during the execution of the SDT, a triggered or performing first measurement is stopped, where the triggered or performing first measurement is triggered or started before the execution of the SDT; in a second case, the terminal does not trigger and does not perform the first measurement before the SDT is performed, and during the execution of the SDT, the first measurement is not triggered from beginning to end, that is, the first measurement is not performed from beginning to end.

In some embodiments, as shown in FIG. 2, the measurement processing method further includes: S203, after the terminal finishes the execution of the SDT, the terminal stops changing the measurement operation to be performed by the terminal in the idle state or the inactive state. Therefore, after the SDT is finished, the measurement operation of the terminal in the idle or the inactive state is resumed in time, where if the terminal is still in the idle or inactive state after the SDT is finished, the measurement operation to be performed by the terminal in the idle or the inactive state is resumed, and if the terminal enters the connected state after finishing the SDT, the measurement operation of the terminal in the connected state can be performed in time.

In S203, stop changing the measurement operation to be performed by the terminal in the idle state or the inactive state includes one or more possible implementations as follows: stopping changing the measurement operation to be performed by the terminal in the idle state or the inactive state for the cell reselection; and resuming the first measurement.

In the embodiment of the present disclosure, in the process of performing the SDT, the terminal changes its own measurement in the idle state or the inactive state includes changing its own measurement operation for the cell reselection to be performed by the terminal in the idle state or the inactive state and/or changing its own first operation to be performed by the terminal in the idle state or the inactive state, to achieve the purpose of reducing unnecessary terminal behavior, reducing power consumption of the terminal and reducing unnecessary interruption in the SDT caused by measurement conducted by the terminal under the condition of ensuring normal operation of the SDT process.

In the following, the "changing the measurement operation for cell reselection to be performed by the terminal in the idle state or the inactive state" will be described by embodiments shown in FIG. 3 to FIG. 5, and the "changing the first operation to be performed by the terminal in the idle state or the inactive state" will be described by the embodiment shown in FIG. 6.

Figure 3:
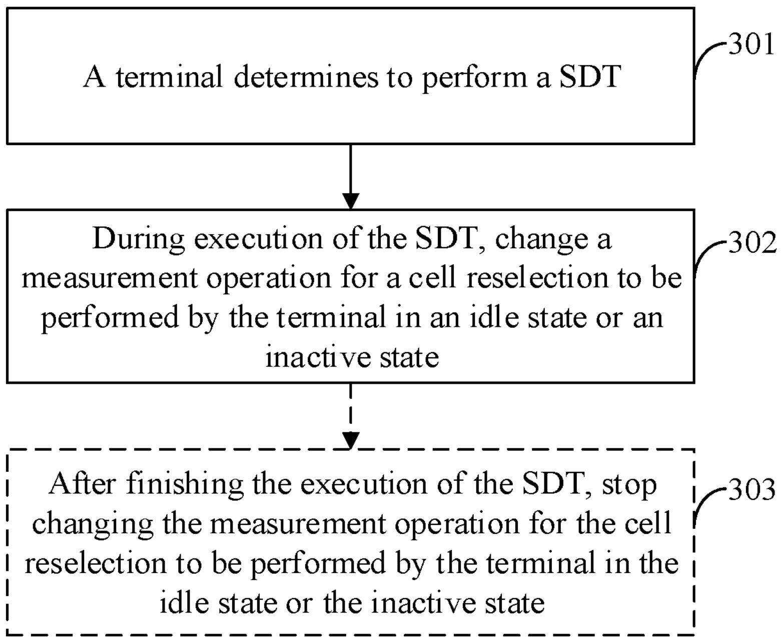
FIG. 3 is a flowchart of a measurement processing method provided by another embodiment of the present disclosure.

Referring to FIG. 3, FIG. 3 is a flowchart of a measurement processing method provided by another embodiment of the present disclosure, which is applied to a terminal. As shown in FIG. 3, the measurement processing method of this embodiment may include:

S301: the terminal determines to perform a SDT.

Among them, the implementation principle and effect of S301 can be referred to the aforementioned embodiment, and will not be repeat here.

S302: during execution of the SDT, change a measurement operation for a cell reselection to be performed by the terminal in an idle state or an inactive state.

Among them, the measurement operation for the cell reselection includes a measurement operation for a service cell and a neighboring cell.

In this embodiment, before performing the SDT, the terminal can continuously perform the measurement operation for the cell reselection in the idle state or the inactive state, and perform the cell reselection based on the measurement result to ensure that the terminal camps on a cell with a higher priority and better channel quality. In the process of performing the SDT, if the terminal continues to perform the measurement operation for the cell reselection in the way before performing the SDT, it will lead to more terminal behaviors and higher terminal power consumption, which will affect the normal execution of the SDT. For example, on one hand, the measurement operation for the cell reselection of the terminal in the idle or the inactive state will occupy transmission resource, on the other hand, the measurement operation for the cell reselection of the terminal in the idle or the inactive state may lead to frequent cell handover, which in turn leads to the interruption of the SDT. In view of the fact that SDT transmits the small data, and the requirements for channel quality are not high, therefore, on the basis of ensuring that the signal quality of the service cell where the terminal is located meets the requirements of SDT, the measurement operation for the cell reselection to be performed by the terminal in idle state or inactive state can be changed, to reduce unnecessary terminal behavior in the measurement operation for the cell reselection, save transmission resources, reduce terminal power consumption, reduce the occurrence probability of cell reselection, and further reduce unnecessary interruption in the SDT.

In some embodiments, as shown in FIG. 3, the measurement processing method further includes S303, after finishing the execution of the SDT, stop changing the measurement operation for cell reselection to be performed by the terminal in the idle state or the inactive state. Therefore, after the termination of the SDT, the terminal can resume the original measurement operation for the cell reselection in the idle state or the inactive state in time. In addition, if the terminal enters the connected state after finishing the SDT, the measurement operation of the terminal for cell reselection in the connected state can be performed in time.

In some embodiments, in S302, the changing the measurement operation for cell reselection to be performed by the terminal in the idle state or the inactive state includes one or more possible implementations as follows: in a first way, a priority of a frequency point corresponding to a service cell where the terminal is located is upgraded; in a second way: the measurement operation for cell reselection is performed according to the first configuration information from a network device, where the first configuration information carries a measurement parameter used for the cell reselection in the SDT. Therefore, under the condition of ensuring the normal operation of the SDT process, by upgrading the priority of the frequency point corresponding to the service cell where the terminal is located and/or by providing configuration information for the measurement operation for the cell reselection in the SDT by the network device separately, the measurement operation for the cell reselection in the SDT can be reduced, occurrence probability of the cell reselection is reduced, and the terminal camps on a current service cell as much as possible. The above two manners are described respectively through two separate embodiments in the following.

Figure 4:
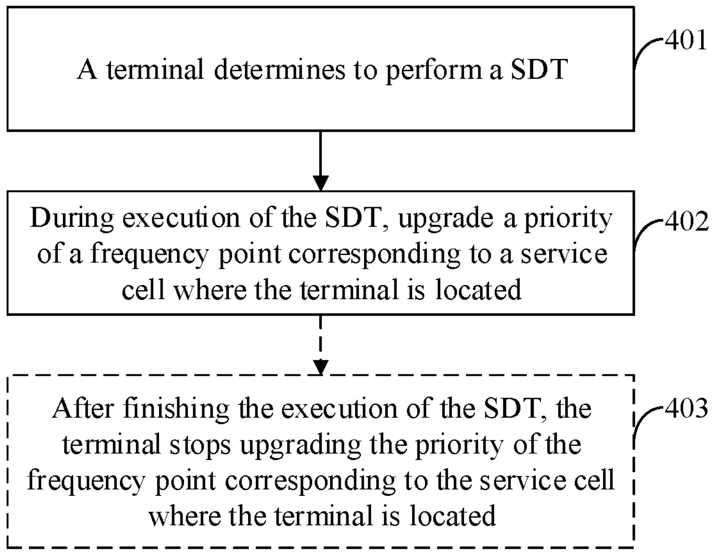
FIG. 4 is a flowchart of a measurement processing method provided by another embodiment of the present disclosure.

Referring to FIG. 4, FIG. 4 is a flowchart of a measurement processing method provided by another embodiment of the present disclosure, which is applied to a terminal. As shown in FIG. 4, the measurement processing method of this embodiment may include:

S401: The terminal determines to perform a SDT.

Among them, the implementation principle and effect of the S401 can be referred to the previous embodiment, and will not be repeated here.

S402: during execution of the SDT, upgrade a priority of a frequency point corresponding to a service cell where the terminal is located.

Among them, in a measurement operation for a cell reselection, the priority of the frequency point corresponding to the service cell where the terminal is located determines a measurement target of the terminal, that is, determines a frequency point to be measured and evaluated by the terminal in the cell reselection, and further determines a number of the terminal behaviors in the measurement operation for the cell reselection. For example, in the measurement rules corresponding to the cell reselection, if a channel condition of the service cell where the terminal is located is good, the terminal can stop measuring the same frequency point or other frequency points with the same priority or low priority, without stopping measuring other frequency points with high priorities. In an evaluation criteria corresponding to the cell reselection, when evaluating other frequency points with high priorities, it is only necessary to evaluate whether a signal quality of a neighboring cell corresponding to the other high-priority frequency points is good enough; and when evaluating other low-priority frequency points, it is necessary to evaluate whether a signal quality of a neighboring cell corresponding to other low-priority frequency points is good enough, and whether the signal quality of the service cell where the terminal is located is lower than a certain threshold.

Therefore, in this embodiment, during the execution of the SDT, by upgrading the priority of frequency point corresponding to the service cell where the terminal is located, the terminal reduces the measurement on different frequency points/neighboring cells, reduces occurrence probability of the cell reselection and reduces the power consumption of the terminal. Among them, the measurement on different frequency points requires interruption on interaction between the terminal and the service cell, and the occurrence of the cell reselection may lead to a failure of the small data transmission, thus, this embodiment effectively reduces unnecessary interruptions in the SDT.

As an example, taking NR as an example, a priority of a frequency point in the cell reselection includes two reselection parameters. One parameter is CellReselectionPriority whose value range is an integer from 0 to 7, where this parameter of a frequency point being 0 means that the priority of the frequency point is the lowest priority, and this parameter of a frequency point being 7 means that the priority of the frequency point is the highest priority. Another parameter is CellReselectionSubPriority, with values of {oDot2, oDot4, oDot6, oDot8}. When the two parameters appear at the same time, the priority of the frequency point is CellReselectionPriority+CellReselectionSubPriority. Therefore, the priority of the frequency point corresponding to the service cell where the terminal is located can be upgraded by changing the CellReselectionPriority in the priority of the frequency point of the service cell, or by changing the CellReselectionPriority in the priority of the frequency point of the neighboring cell.

In some embodiments, as shown in FIG. 4, the measurement processing method further includes S403: after finishing the execution of the SDT, the terminal stops upgrading the priority of the frequency point corresponding to the service cell where the terminal is located. Therefore, after the termination of the SDT, if the terminal is still in the idle state or the inactive state, the terminal will resume the original measurement operation for the cell reselection in the idle state or the inactive state in time, and if the terminal enters the connected state, the terminal will timely perform the measurement operation for the cell reselection in the connected state.

In some embodiments, S402 can be implemented in at least one of the following manners.

Manner 1: During the execution of the SDT, a priority of a first frequency point is downgraded, where the first frequency point is other frequency points with a priority higher than the priority of the frequency point corresponding to the service cell where the terminal is located. Therefore, after the SDT is performed, the priority of other frequency points with higher priority is downgraded, to achieve the purpose of upgrading the priority of the frequency point of the service cell where the terminal is located.

In an implementation, the way of downgrading the priority of the first frequency point during the execution of the SDT includes: during the execution of the SDT, adjusting the priority of the first frequency point to be lower than or equal to that of the frequency point of the service cell where the terminal is located, to ensure that the priority of the frequency point of the service cell where the terminal is located has the highest priority.

Further, when the priority of the first frequency point is adjusted to be lower than that of the frequency point in the service cell where the terminal is located, the priority of the frequency point corresponding to the service cell where the terminal is located can be subtracted by a preset threshold to obtain a difference value, and the priority of the first frequency point can be determined as the difference value. For example, the priority of the first frequency point is set as a difference value obtained by subtracting 0.2 from the priority of the frequency point corresponding to the service cell where the terminal is located.

Among them, for example, the priority of the first frequency point can be downgraded by reducing the CellReselectionPriority in the priority of the first frequency point.

Manner 2: During the execution of the SDT, the priority of the frequency point corresponding to the service cell where the terminal is located is set as the highest priority, and the priorities of other frequency points are lower than the priority corresponding to the service cell where the terminal is located. In the measurement operation for the cell reselection, only when the channel quality of the service cell where the terminal is located is lower than a threshold, can the terminal measure other frequency points with priority lower than that of the frequency points corresponding to the service cell where the terminal is located. Therefore, on the basis of ensuring that the channel quality of the service cell meets the SDT requirements, the measurement targets (i.e. measurement on the frequency), measurement behaviors and evaluation behaviors that the terminal needs to perform in the measurement operation for the cell reselection are reduced, unnecessary measurements of the terminal are reduced, the occurrence possibility of the cell reselection is reduced and power consumption is reduced, thus unnecessary interruption in the SDT is reduced. For example, the CellReselectionPriority in the priority of the frequency point corresponding to the service cell where the terminal is located can be set to 7.

Figure 5:
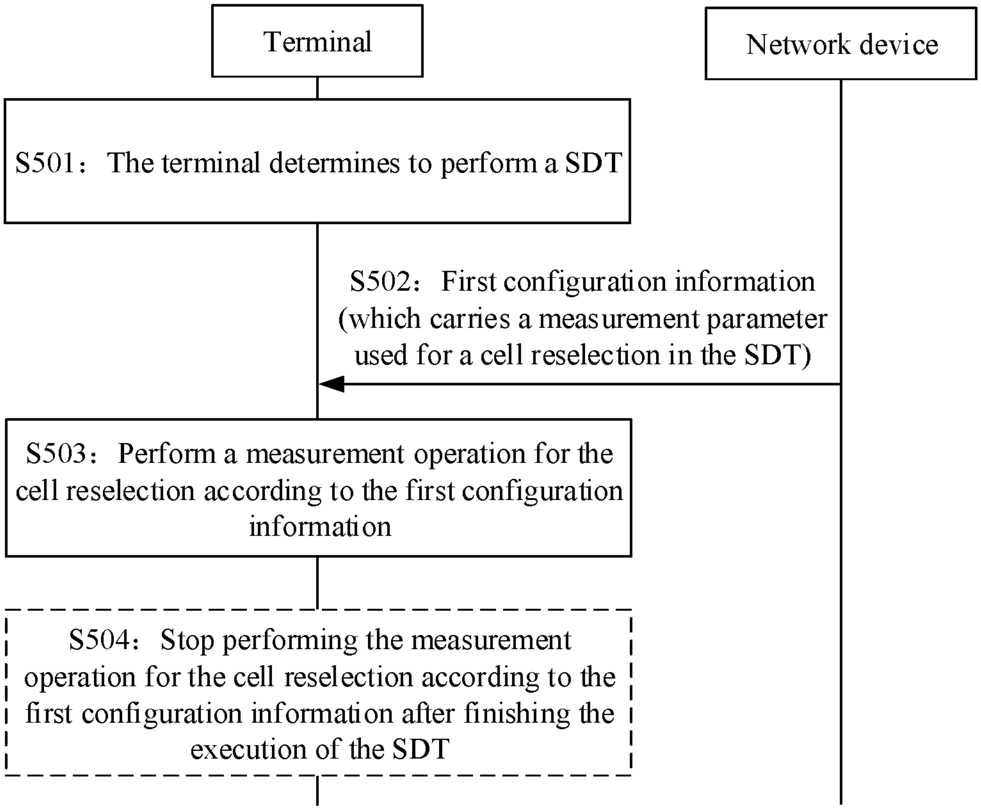
FIG. 5 is a flowchart of a measurement processing method provided by another embodiment of the present disclosure.

Referring to FIG. 5, FIG. 5 is a flowchart of a measurement processing method provided by another embodiment of the present disclosure. As shown in FIG. 5, the measurement processing method of this embodiment may include:

S501: a terminal determines to perform a SDT.

Among them, the implementation principle and effect of S501 can be referred to the previous embodiment, and will not be repeated here.

S502: a network device sends first configuration information to the terminal, where the first configuration information carries a measurement parameter used for a cell reselection in the SDT.

Among them, S502 may be performed before or after the S501.

The network device can broadcast the first configuration information or send the first configuration information to the terminal through a dedicated signaling (such as a RRC Release message).

S503: The terminal performs a measurement operation for the cell reselection according to the first configuration information.

In this embodiment, the network device can provide the first configuration information to the terminal separately for the SDT execution process of the terminal. After receiving the first configuration information from the network device, the terminal performs the measurement operation for the cell reselection according to the first configuration information during the execution of SDT. Therefore, on one hand, by providing the configuration information for the measurement specially during the execution of the SDT by the network device, the measurement target, measurement behavior and evaluation behavior of the terminal in the measurement for the cell reselection in the SDT are reduced, to reduce unnecessary terminal behavior, reducing terminal power consumption, reducing occurrence probability of cell reselection and unnecessary interruption in the SDT. On the other hand, the network device can control the mobility of the terminal during the execution process of the SDT in a more flexible way.

In some embodiments, the measurement parameter carried in the first configuration information includes at least one of the following measurement parameters: a frequency point to be measured, a priority of the frequency point to be measured, an offset value corresponding to the frequency point to be measured during the cell reselection, a cell to be measured, an offset value corresponding to the cell to be measured during the cell reselection, or an effective time. Therefore, the network device reduces the measurement target, the measurement behavior, and the evaluation behavior, etc. of the terminal in the measurement for the cell reselection by providing at least one of the above measurement parameters for the cell reselection in the SDT execution process of the terminal.

Among them, the frequency point to be measured can be used to determine the frequency point to be measured by the terminal in the SDT process, for example, the frequency point to be measured can be represented by a frequency point list. The cell to be measured can be used to restrict a cell to be measured by the terminal in the SDT process, for example, the cell to be measured can be identified by a cell list. The offset value corresponding to the frequency point to be measured during the cell reselection and the offset value corresponding to the cell to be measured during the cell reselection can be used to influence an occurrence probability of the cell reselection during the SDT. The effective time is used to indicate how long the configuration information will be invalid after the configuration.

Among them, the network device can configure a small number of frequency points to be measured, and/or set in the priority of the frequency point to be measured that the priority of other frequency points to be measured to be lower than that of the frequency point corresponding to the service cell where the terminal is located, and/or set the offset value corresponding to the frequency point to be measured and the terminal tends to select the frequency point corresponding to the service cell where the terminal is located during the cell reselection, and/or configure a small number of cells to be measured, and/or set offset value corresponding to cell to be measured during the cell reselection and the terminal tends to select the service cell during the cell reselection. Therefore, the purpose of reducing measurement on same frequency and/or different frequency measurement and reducing the occurrence probability of the cell reselection in the SDT is achieved.

In an implementation, the offset value corresponding to the frequency point to be measured during cell reselection includes: the offset value corresponding to the measurement for the service cell in the cell reselection criterion and the offset value for measurement on other frequency points except the frequency point corresponding to the service cell where the terminal is located. Therefore, by setting the offset value for the measurement on the service cell and the offset value for measurement on other frequency points, the terminal tends to select the frequency point corresponding to the service cell where the terminal is located when measuring the frequency point in the SDT, and the occurrence probability of the cell reselection can be reduced.

Furthermore, the cell reselection criterion is the R criterion of the cell reselection. The offset value for the measurement on the service cell may include a cell reselection hysteresis value Qhyst measured for the service cell, and the offset value for measurement on other frequency points except the frequency point corresponding to the service cell where the terminal is located may include the cell offset Qoffset measured for the other frequency points. Among them, Qhyst and Qoffset are used to control the difficulty of the cell reselection, and the occurrence probability of the cell reselection can be reduced by setting the Qhyst and the Qoffset.

In an implementation, the offset corresponding to the cell to be measured during the cell reselection may include a punitive offset $Qoffset_{temp}$ after the terminal fails to access the cell in the R criterion of the cell reselection, where the $Qoffset_{temp}$ is also known as a punitive factor, and can also be used to reduce the occurrence probability of the cell reselection in the SDT process.

In some embodiments, under a condition that the measurement parameter in the first configuration information is missed, the first configuration information can be combined with second configuration information for the measurement of the cell reselection in the SDT process. At this time, a possible implementation of the S503 includes: if it is determined that the measurement parameter in the first configuration information is missed, performing a measurement for the cell reselection according to the first configuration information and the second configuration information; where the second configuration information carries a measurement parameter used for the terminal to perform the cell reselection when the SDT is not performed, in other words, the second configuration information is used for the terminal in the idle state or the inactive state to perform measurement operation for the cell reselection when the SDT is not performed.

In this embodiment, the first configuration information provided by the network device may not contain all the measurement parameters. In case that the measurement parameter in the first configuration information is missed, the terminal may perform the measurement operation for the cell reselection based on the first configuration information and the measurement parameter missed in the first configuration but contained in the second configuration information.

For example, the first configuration information only includes the frequency points to be measured and the priority of each frequency point to be measured (for example, a frequency point f1, a corresponding priority of which is 7; a frequency f2, a corresponding priority of which is 6). Based on the first configuration information, the terminal determines the frequency point to be measured and the priority of the frequency point to be measured during the execution of the SDT. However, this configuration information does not carry other measurement parameters involved in the cell reselection and measurement (for example, the offset value corresponding to the frequency point to be measured during the cell reselection, the cell to be measured, the offset value corresponding to the cell to be measured during the cell reselection, etc.). At this time, the second configuration information can be obtained from a system message broadcasted by the service cell. The second configuration information carries the measurement parameter of the cell reselection corresponding to the frequency point to be measured (such as the offset value Qoffset corresponding to the frequency point f1, a list of a cell to be measured and the offset value $Qoffset_{temp}$ corresponding to the cell to be measured), and the terminal performs the measurement operation for the cell reselection based on these measurement parameters in the first configuration information and the second configuration information.

In some embodiments, as shown in FIG. 5, after the 503, the measurement processing method further includes S504: the terminal stops performing the measurement operation for the cell reselection according to the first configuration information after finishing the execution of the SDT. In an implementation, if the terminal is still in the idle state or the inactive state after finishing the execution of the SDT, the terminal can perform the measurement operation for the cell reselection according to the second configuration information.

Figure 6:
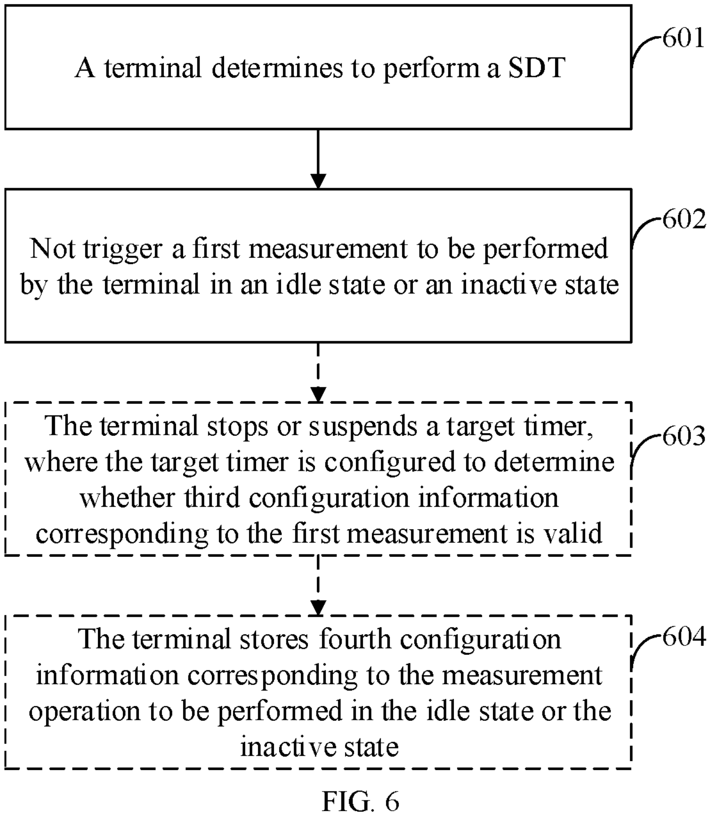
FIG. 6 is a flowchart of a measurement processing method provided by another embodiment of the present disclosure.

Referring to FIG. 6, FIG. 6 is a flowchart of a measurement processing method provided by another embodiment of the present disclosure, which is applied to a terminal. As shown in FIG. 6, the measurement processing method in this embodiment may include:

S601: The terminal determines to perform a SDT.

Among them, the implementation principle and effect of the S601 can be referred to the previous embodiment, and will not be repeated here.

S602: Stop or not trigger a first measurement to be performed by the terminal in an idle state or an inactive state.

Among them, the first measurement can be referred to the aforementioned embodiment and will not be not be repeated here.

In this embodiment, the first measurement is not a necessary terminal behavior during the execution of the SDT conducted by the terminal, thus, the first measurement can be stopped or not triggered, that is, the first measurement is not performed during the execution of the SDT, to reduce unnecessary terminal behavior, reduce power consumption of the terminal and unnecessary interruption caused by measurement behavior in the SDT.

In some embodiments, as shown in FIG. 6, after S602, the measurement processing method further includes: S603, the terminal stops or suspends a target timer, where the target timer is configured to determine whether third configuration information corresponding to the first measurement is valid. Among them, the third configuration information is configuration information corresponding to the first measurement. After the first measurement is stopped, the timer configured to determine whether the third configuration information corresponding to the first measurement is valid is not in a need of continuous being allowed, thus, the operation of the target timer can be stopped to reduce the terminal behavior.

In an implementation, the target timer is T331. T331 is a timer in NR configured to determine whether the configuration information corresponding to the idle/inactive measurement is valid. If the timer times out, the terminal clears the received configuration information corresponding to the idle/inactive measurement.

In some embodiments, as shown in FIG. 6, after the S602, the measurement processing method further includes: S604, the terminal stores fourth configuration information corresponding to the measurement operation to be performed in the idle state or the inactive state, to enable the terminal to perform a measurement operation according to the fourth configuration information after finishing the SDT, to reduce a data transmission amount between the terminal and the network device. The fourth configuration information may be the same information or different information from the third configuration information. When the fourth configuration information and the third configuration information are the same information, after finishing the SDT, the terminal can resume the execution of the first measurement stopped before based on the fourth configuration information. When the fourth configuration information and the third configuration information are different information, the terminal in the idle state or the inactive state can perform a measurement operation corresponding to the fourth configuration information based on the fourth configuration information after finishing the SDT.

Further, since the terminal retains the fourth configuration information, the network device can send a difference between fifth configuration information and the fourth configuration information to the terminal based on the fourth configuration information, where a measurement operation corresponding to the fifth configuration information and the measurement operation corresponding to the fourth configuration information belong to a same type but at different times, to save air interface overhead.

In some embodiments, after suspending the target timer, the measurement processing method further includes: after finishing the execution of the SDT, the terminal starts or resumes the target timer. Therefore, the terminal starts or resumes the first measurement in time after finishing the SDT.

Figure 7:
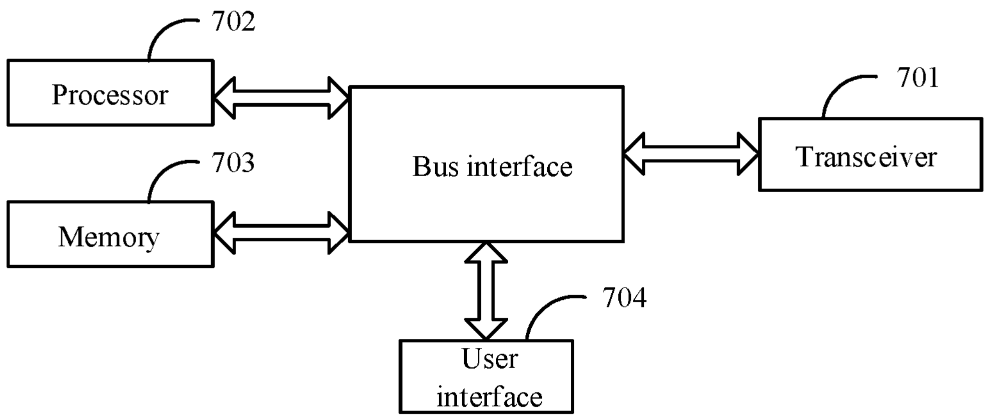
FIG. 7 is a schematic structural diagram of a measurement processing apparatus provided by an embodiment of the present disclosure.

On the terminal side, an embodiment of the present disclosure provides a measurement processing apparatus, and the measurement processing apparatus of this embodiment can be a terminal. As shown in FIG. 7, the measurement processing apparatus may include a transceiver 701, a processor 702 and a memory 703.

The transceiver 701 is configured for receiving and transmitting data under control of the processor 702.

Among them, in FIG. 7, the bus architecture can include any number of interconnected buses and bridges. Specifically, one or more processors represented by the processor 702 and various circuits of memory represented by the memory 703 are linked together. The bus architecture can also link various other circuits, such as peripheral devices, voltage regulators and power management circuits, which are well known in the art, so they will not be further described here. The bus interface provides the interface. The transceiver 701 can be multiple elements, that is, it includes a transmitter and a receiver, and provides a unit for communicating with various other devices on transmission media, where the transmission media includes wireless channels, wired channels, optical cables and other transmission media. In an implementation, the measurement processing device can also include a user interface 704, which can also be an interface capable of externally connecting devices needed for internal connection for different user devices, the connected device includes but not limited to a keypad, a display, a speaker, a microphone, a joystick and the like.

The processor 702 is responsible for managing the bus architecture and general processing, and the memory 703 can store data used by the processor 702 when performing operations.

In an implementation, the processor 702 may be a central processing unit (CPU), an application specific integrated circuit (ASIC), a field-programmable gate array (FPGA), or complex programmable logic device (CPLD), and the processor 702 may also adopt a multi-core architecture.

The processor 702 calls the computer program stored in the memory 703 to execute any of the methods related to the terminal provided by the embodiment of the present disclosure according to the obtained executable instructions. The processor and the memory can also be physically separated.

Specifically, the processor 702 is configured to perform the following operations: determining to perform a small data transmission SDT; and changing a measurement operation to be performed by the terminal in an idle state or an inactive state during execution of the SDT. The changing the measurement operation to be performed by the terminal in the idle state or the inactive state includes one or more of the following: changing a measurement operation for a cell reselection to be performed by the terminal in the idle state or the inactive state; and stopping or not triggering a first measurement to be performed by the terminal in the idle state or the inactive state, where a measurement result of the first measurement is used to assist the terminal in configuring a DC or configuring a CA in an active state.

In an implementation, the processor 702 is further configured to perform the following operations: upgrading a priority of a frequency point corresponding to a service cell where the terminal is located; and performing the measurement operation for the cell reselection according to first configuration information from a network device, where the first configuration information carries a measurement parameter used for the cell reselection in the SDT.

In an implementation, the processor 702 is further configured to perform one or more of the following operations: downgrading a priority of a first frequency point, where the first frequency point is other frequency points with higher priority than the priority of the frequency point corresponding to the service cell where the terminal is located; and setting the priority of the frequency point corresponding to the service cell where the terminal is located as a highest priority.

In an implementation, the processor 702 is further configured to perform the following operation: if it is determined that the measurement parameter in the first configuration information is missed, performing a measurement for the cell reselection according to the first configuration information and second configuration information; where the second configuration information carries a measurement parameter used for the cell reselection when the SDT is not performed.

In an implementation, the first configuration information includes at least one of the following measurement parameters: a frequency point to be measured, a priority of the frequency point to be measured, an offset value corresponding to the frequency point to be measured during the cell reselection, a cell to be measured, an offset value corresponding to the cell to be measured during the cell reselection, or an effective time.

In an implementation, the processor 702 is further configured to perform the following operations: if the first measurement to be performed by the terminal in the idle state or the inactive state is stopped or not triggered during the execution of the SDT, stopping or suspending a target timer, where the target timer is configured to determine whether third configuration information corresponding to the execution of the first measurement is valid; and/or storing fourth configuration information corresponding to the measurement operation to be performed by the terminal in the idle state or the inactive state, and the terminal is configured to perform the measurement operation according to the fourth configuration information after finishing the SDT.

In an implementation, the processor 702 is further configured to perform the following operation: starting or resuming the target timer after the execution of the SDT is finished.

It should be noted here that the above apparatus provided by the embodiment of the present disclosure can realize all the method steps realized by the terminal in the method embodiments, and can achieve the same effect, and the same parts and beneficial effects in this embodiment with those described in the method embodiments are not repeated here.

Figure 8:
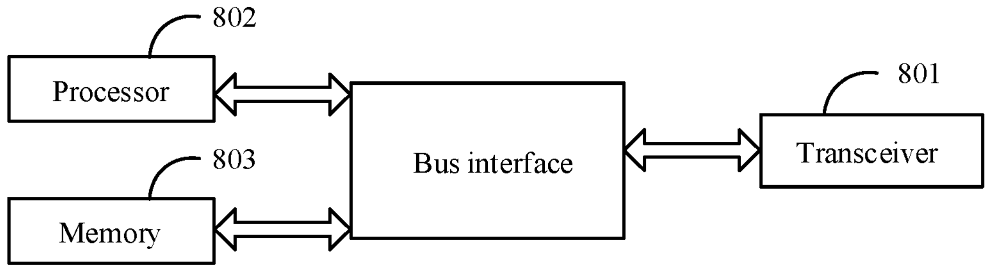
FIG. 8 is a schematic structural diagram of a measurement processing apparatus provided by another embodiment of the present disclosure.

On the network side, an embodiment of the present disclosure provides a measurement processing apparatus, and the measurement processing apparatus of this embodiment can be a network device. As shown in FIG. 8, the measurement processing apparatus may include a transceiver 801, a processor 802 and a memory 803.

The transceiver 801 is configured for receiving and transmitting data under the control of the processor 802.

Among them, in FIG. 8, the bus architecture can include any number of interconnected buses and bridges. Specifically, one or more processors represented by the processor 802 and various circuits of memory represented by the memory 803 are linked together. The bus architecture can also link various other circuits, such as peripheral devices, voltage regulators and power management circuits, which are well known in the art, so they will not be further described here. The bus interface provides the interface. The transceiver 801 can be multiple elements, that is, it includes a transmitter and a receiver, and provides a unit for communicating with various other apparatuses on transmission media, where the transmission media includes wireless channels, wired channels, optical cables and other transmission media. The processor 802 is responsible for managing the bus architecture and general processing, and the memory 803 can store data used by the processor 802 when performing operations.

The processor 802 can be a CPU, ASIC, FPGA or CPLD, and the processor can also adopt a multi-core architecture.

By calling the computer program stored in the memory 803, the processor 802 is used to perform any of the methods related to network devices provided by the embodiment of the present disclosure according to the obtained executable instructions. The processor and the memory can also be physically separated.

Specifically, the processor 802 is configured to perform the following operation: sending first configuration information to a terminal, where the first configuration information carries a measurement parameter used for the terminal to perform a cell reselection in a SDT.

In an implementation, the first configuration information includes at least one of the following measurement parameters: a frequency point to be measured, a priority of the frequency point to be measured, an offset value corresponding to the frequency point to be measured during the cell reselection, a cell to be measured, an offset value corresponding to the cell to be measured during the cell reselection, or an effective time.

It should be noted here that the above apparatus provided by the embodiment of the present disclosure can realize all the method steps realized by the network device in the method embodiments, and can achieve the same effect, and the same parts and beneficial effects in this embodiment with those described in the method embodiments are not repeated here.

Figure 9:
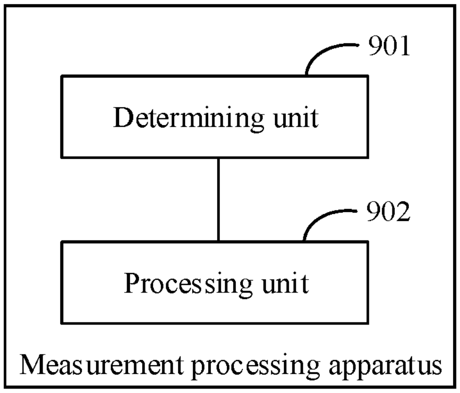
FIG. 9 is a schematic structural diagram of a measurement processing apparatus provided by another embodiment of the present disclosure.

On the terminal side, an embodiment of the present disclosure provides a measurement processing apparatus, and the measurement processing apparatus of this embodiment can be a terminal. As shown in FIG. 9, the measurement processing apparatus may include a determining unit 901 and a processing unit 902.

The determining unit 901 is configured to determine to perform a small data transmission SDT; and the processing unit is configured to change a measurement operation to be performed by the terminal in an idle state or an inactive state during execution of the SDT. The changing the measurement operation to be performed by the terminal in the idle state or the inactive state includes one or more of the following: changing a measurement operation for a cell reselection to be performed by the terminal in the idle state or the inactive state; and stopping or not triggering a first measurement to be performed by the terminal in the idle state or the inactive state, where a measurement result of the first measurement is used to assist the terminal in configuring a DC or configuring a CA in an active state.

In an implementation, the processing unit 902 is further configured to perform one or more of the following operations: upgrading a priority of a frequency point corresponding to a service cell where the terminal is located; and performing the measurement operation for the cell reselection according to first configuration information from a network device, where the first configuration information carries a measurement parameter used for the cell reselection in the SDT.

In an implementation, the processing unit 902 is further configured to perform one or more of the following operations: downgrading a priority of a first frequency point, where the first frequency point is other frequency points with higher priority than the priority of the frequency point corresponding to the service cell where the terminal is located; and setting the priority of the frequency point corresponding to the service cell where the terminal is located as a highest priority.

In an implementation, the processing unit 902 is further configured to perform the following operation: if it is determined that the measurement parameter in the first configuration information is missed, performing a measurement for the cell reselection according to the first configuration information and second configuration information; where the second configuration information carries a measurement parameter used for the cell reselection when the SDT is not performed.

In an implementation, the first configuration information includes at least one of the following measurement parameters: a frequency point to be measured, a priority of the frequency point to be measured, an offset value corresponding to the frequency point to be measured during the cell reselection, a cell to be measured, an offset value corresponding to the cell to be measured during the cell reselection, or an effective time.

In an implementation, the processing unit 902 is further configured to perform the following operations: if the first measurement to be performed by the terminal in the idle state or the inactive state is stopped or not triggered during the execution of the SDT, stopping or suspending a target timer, where the target timer is configured to determine whether third configuration information corresponding to the execution of the first measurement is valid; and/or storing fourth configuration information corresponding to the measurement operation to be performed by the terminal in the idle state or the inactive state, and the terminal is configured to perform the measurement operation according to the fourth configuration information after finishing the SDT.

In an implementation, the processing unit 902 is further configured to perform the following operation: starting or resuming the target timer after the execution of the SDT is finished.

It should be noted here that the above apparatus provided by the embodiment of the present disclosure can realize all the method steps realized by the device in the method embodiments, and can achieve the same effect, and the same parts and beneficial effects in this embodiment with those described in the method embodiments are not repeated here.

Figure 10:
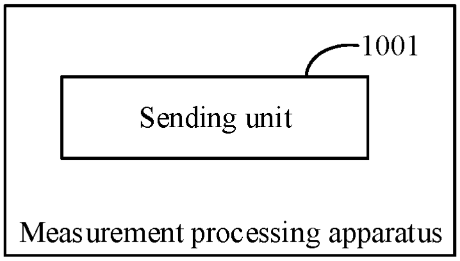
FIG. 10 is a schematic structural diagram of a measurement processing apparatus provided by another embodiment of the present disclosure.

In the network side, the present disclosure further provides a measurement processing apparatus, and the measurement processing apparatus in this embodiment could be a network device. As shown in FIG. 10, the measurement processing apparatus includes: a sending unit 1001.

The sending unit 1001 is configured to send first configuration information to a terminal, where the first configuration information carries a measurement parameter used for the terminal to perform a cell reselection in a SDT.

In an implementation, the first configuration information includes at least one of the following measurement parameters: a frequency point to be measured, a priority of the frequency point to be measured, an offset value corresponding to the frequency point to be measured during the cell reselection, a cell to be measured, an offset value corresponding to the cell to be measured during the cell reselection, or an effective time.

It should be noted here that the above apparatus provided by the embodiment of the present disclosure can realize all the method steps realized by the network device in the method embodiments, and can achieve the same effect, and the same parts and beneficial effects in this embodiment with those described in the method embodiments are not repeated here.

It should be noted that the division of the units in the embodiments of the present disclosure is schematic and is only a logical functional division. In an actual implementation, there may be other division manners. In addition, each functional unit in each embodiment of the present application may be integrated in a single processing unit, or each unit may be physically present separately, or two or more units may be integrated in a single unit. The above integrated units can be implemented either in the form of hardware or in the form of software functional units.

The integrated units may be stored in a processor-readable storage medium when implemented in the form of software function units and sold or used as an independent product. Based on this understanding, the embodiment of the present disclosure is essentially, or the part which makes contribution to the prior art, or all or part of the embodiments can be embodied in the form of a software product. The computer software product may be stored in a storage medium, including several instructions for enabling a computer device (which may be a personal computer, a server, or a network device, etc.) or a processor to execute all or part of the steps of the methods in the various embodiments of the present disclosure. The aforementioned storage media includes: a U disk, a mobile hard disk, a read-only memory (ROM), a random access memory (RAM), a magnetic disk or an optical disk and other medium that can store program codes.

At terminal side, an embodiment of the present disclosure provides a processor-readable storage medium, where the processor-readable storage medium has a computer program stored thereon. The computer program is used to enable the processor to execute any one of the methods related to the terminal according to the embodiment of the present disclosure. To enable the processor to implement all the method steps implemented by the terminal in the above method embodiments and achieve the same effect, the same part and beneficial effect in this embodiment and the method embodiment will not be described in detail.

At network side, an embodiment of the present disclosure provides a processor-readable storage medium, where the processor-readable storage medium has a computer program stored thereon. The computer program is used to enable the processor to execute any one of the methods related to the network device according to the embodiment of the present disclosure. To enable the processor to implement all the method steps implemented by the network device in the above method embodiments and achieve the same effect, the same part and beneficial effect in this embodiment and the method embodiment will not be described in detail.

The processor-readable storage medium may be any available medium or data storage device that can be accessed by the processor, including but not limited to a magnetic storage (such as a floppy disk, a hard disk, a magnetic tape, a magneto-optical disk (MO), etc.), an optical storage (such as CD, DVD, BD, HVD, etc.), and a semiconductor storage (such as an ROM, an EPROM, an EEPROM, a non-volatile memory (NAND FLASH), a solid state disk (SSD)), etc.

Embodiments of the present disclosure may be provided as methods, systems, or computer program products. Accordingly, the present disclosure may take the form of an entirely hardware embodiment, an entirely software embodiment or an embodiment combining software and hardware aspects. The present disclosure may take the form of a computer program product embodied on one or more computer-usable storage mediums (including but not limited to a disk storage and an optical storage, etc.) having a computer-usable program code stored thereon.

The present disclosure is described with reference to flowcharts and/or block diagrams of methods, apparatus, and computer program products according to embodiments of the present disclosure. It should be understood that each procedure and/or block in the flowchart and/or block diagrams, and combinations of procedures and/or blocks in the flowchart and/or block diagrams can be implemented by the computer-executable instruction. These computer-executable instructions may be provided to a processor of a general-purpose computer, a specialized computer, an embedded processor, or other programmable data processing device to produce a machine, and an apparatus for implementing a function specified in one or more processes of the flowchart and/or one or more blocks of the block diagram may be produced via the instructions executed by the processor of the computer or other programmable data processing device.

These processor-executable instructions may also be stored in a processor-readable memory capable of directing a computer or other programmable data processors to operate in a specific manner, and the instructions stored in the processor-readable memory produce a manufacturing product including an instruction apparatus, where the instruction apparatus implements the function specified in one or more procedures of the flow chart and/or one or more blocks of the block diagram.

These processor-executable instructions may also be loaded onto a computer or other programmable data processing device, and a series of operational steps may be performed on the computer or other programmable device to produce computer-implemented processing. Therefore, the instructions executed on the computer or other programmable device provide steps for implementing the functions specified in one or more processes of the flowchart and/or one or more blocks of the block diagram.

Various modifications and variations of the present disclosure without going beyond the spirit and scope of the present disclosure. In this way, if these modifications and variations of the present disclosure fall within the scope of the claims of the present disclosure and equivalent technologies thereof, the present disclosure is also intended to include these modifications and variations.

The invention claimed is:

1. A measurement processing method applied to a terminal, the method comprising:

determining to perform a small data transmission (SDT) procedure; and changing a measurement operation to be performed by the terminal in an idle state or an inactive state during the SDT procedure;

wherein the changing the measurement operation to be performed by the terminal in the idle state or the inactive state comprises:

changing a measurement operation for a cell reselection to be performed by the terminal in the idle state or the inactive state;

wherein the changing the measurement operation for the cell reselection to be performed by the terminal in the idle state or the inactive state comprises one or more of the following:

upgrading a priority of a frequency point corresponding to a service cell where the terminal is located; and performing the measurement operation for the cell reselection according to first configuration information from a network device, wherein the first configuration information carries a measurement parameter used for the cell reselection in the SDT procedure.

2. The measurement processing method according to claim 1, wherein the upgrading the priority of the frequency point corresponding to the service cell where the terminal is located comprises one or more of the following:

downgrading a priority of a first frequency point, wherein the first frequency point is other frequency points with higher priority than the priority of the frequency point corresponding to the service cell where the terminal is located; and setting the priority of the frequency point corresponding to the service cell where the terminal is located as a highest priority.

3. The measurement processing method according to claim 1, wherein the performing the measurement operation for the cell reselection according to the first configuration information from the network device comprises:

responsive to determining that the measurement parameter in the first configuration information is missed, performing a measurement for the cell reselection according to the first configuration information and second configuration information;

wherein the second configuration information carries a measurement parameter used for the cell reselection when the SDT procedure is not performed.

4. The measurement processing method according to claim 1, wherein the first configuration information comprises at least one of the following measurement parameters: a frequency point to be measured, a priority of the frequency point to be measured, an offset value corresponding to the frequency point to be measured during the cell reselection, a cell to be measured, an offset value corresponding to the cell to be measured during the cell reselection, or an effective time.

5. A non-transitory processor-readable storage medium, wherein a computer program is stored in the processor-readable storage medium, and the computer program is used for causing a processor to perform the measurement processing method according to claim 1.

6. The measurement processing method according to claim 1, wherein the changing the measurement operation to be performed by the terminal in the idle state or the inactive state further comprises:

not performing a first measurement to be performed by the terminal in the idle state or the inactive state, wherein a measurement result of the first measurement is used to assist the terminal in configuring a dual connectivity (DC) or configuring a carrier aggregation (CA) in an active state.

7. The measurement processing method according to claim 6, further comprising:

responsive to determining that the first measurement to be performed by the terminal in the idle state or the inactive state is not performed during the SDT procedure, stopping or suspending a target timer, wherein the target timer is configured to determine whether third configuration information corresponding to the execution of the first measurement is valid;

and/or storing fourth configuration information corresponding to the measurement operation to be performed by the terminal in the idle state or the inactive state, wherein the terminal is configured to perform the measurement operation according to the fourth configuration information after finishing the SDT procedure.

8. The measurement processing method according to claim 7, wherein after stopping or suspending the target timer, the method further comprises:

starting or resuming the target timer after the SDT procedure is finished.

9. A measurement processing apparatus applied to a terminal, the apparatus comprising a memory, a transceiver and a processor;

the memory is configured to store a computer program;

the transceiver is configured to transmit and receive data under control of the processor;

the processor is configured to read the computer program in the memory and performing the following operations:

determining to perform a small data transmission (SDT) procedure; and changing a measurement operation to be performed by the terminal in an idle state or an inactive state during the SDT procedure;

wherein the changing the measurement operation to be performed by the terminal in the idle state or the inactive state comprises:

changing a measurement operation for a cell reselection to be performed by the terminal in the idle state or the inactive state;

wherein the processor is further configured to perform one or more of the following operations:

upgrading a priority of a frequency point corresponding to a service cell where the terminal is located; and performing the measurement operation for the cell reselection according to first configuration information from a network device, wherein the first configuration information carries a measurement parameter used for the cell reselection in the SDT procedure.

10. The measurement processing apparatus according to claim 9, wherein the processor is further configured to perform one or more of the following operations:

downgrading a priority of a first frequency point, wherein the first frequency point is other frequency points with higher priority than the priority of the frequency point corresponding to the service cell where the terminal is located; and setting the priority of the frequency point corresponding to the service cell where the terminal is located as a highest priority.

11. The measurement processing apparatus according to claim 9, wherein the processor is further configured to perform the following operation:

responsive to determining that the measurement parameter in the first configuration information is missed, performing a measurement for the cell reselection according to the first configuration information and second configuration information;

wherein the second configuration information carries a measurement parameter used for the cell reselection when the SDT procedure is not performed.

12. The measurement processing apparatus according to claim 9, wherein the first configuration information comprises at least one of the following measurement parameters: a frequency point to be measured, a priority of the frequency point to be measured, an offset value corresponding to the frequency point to be measured during the cell reselection, a cell to be measured, an offset value corresponding to the cell to be measured during the cell reselection, or an effective time.

13. The measurement processing apparatus according to claim 9, wherein the processor is further configured to perform the following operation:

not performing a first measurement to be performed by the terminal in the idle state or the inactive state, wherein a measurement result of the first measurement is used to assist the terminal in configuring a dual connectivity (DC) or configuring a carrier aggregation (CA) in an active state.

14. The measurement processing apparatus according to claim 13, wherein the processor is further configured to perform one or more of the following operations:

responsive to determining that the first measurement to be performed by the terminal in the idle state or the inactive state is not performed during the SDT procedure, stopping or suspending a target timer, wherein the target timer is configured to determine whether third configuration information corresponding to the execution of the first measurement is valid; and storing fourth configuration information corresponding to the measurement operation to be performed by the terminal in the idle state or the inactive state, wherein the terminal is configured to perform the measurement operation according to the fourth configuration information after finishing the SDT procedure.

15. The measurement processing apparatus according to claim 14, wherein the processor is further configured to perform the following operation:

starting or resuming the target timer after the SDT procedure is finished.

* * * * *